Figure 1:
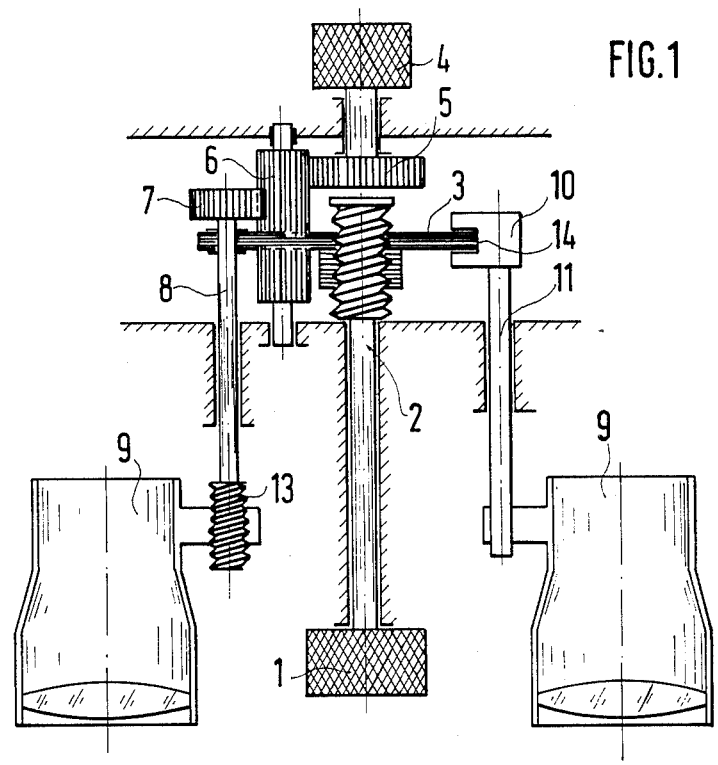

United States Patent [19]

Riedl

[11] Patent Number: 4,750,823
[45] Date of Patent: Jun. 14, 1988

[54] CENTRAL FOCUSSING DEVICE FOR INTERNAL FOCUSSING IN BINOCULARS

[75] Inventor: Bernhard Riedl, Hall in Tirol, Austria
[73] Assignee: D. Swarovski & Co., Wattens, Austria
[21] Appl. No.: 881,277
[22] Filed: Jul. 2, 1986
[30] Foreign Application Priority Data

Jul. 5, 1985 [DE] Fed. Rep. of Germany ....... 3524152

[51] Int. Cl.⁴ .............................. G02B 7/06; G02B 7/12
[52] U.S. Cl. .................................................. 350/552
[58] Field of Search ................................ 350/545–556

[56] References Cited

U.S. PATENT DOCUMENTS 4,329,013  5/1982  Hengst ................................. 350/550
4,630,901 12/1986  Altenheiner et al. ................ 350/552

FOREIGN PATENT DOCUMENTS 2522738 12/1976  Fed. Rep. of Germany .
2618497  8/1977  Fed. Rep. of Germany .
3205583C2 8/1983  Fed. Rep. of Germany .
 765272  1/1957  United Kingdom ................ 350/552

Primary Examiner—William H. Punter
Attorney, Agent, or Firm—Bacon & Thomas

[57] ABSTRACT

A central focussing device for internal focussing in binoculars, wherein a focussing wheel engages a displaceable bridge via a threaded spindle and the objectives are connected to the displaceable bridge via driving shafts for the purpose of focussing, a diopter adjustment wheel engages one of the driving shafts with screw drive via a driving toothed wheel, an intermediate toothed wheel and a driven toothed wheel in order to vary the position of an objective for diopter adjustment, the intermediate toothed wheel being directed through the bridge or beside and past it and being of a height such that the driven toothed wheel engages the intermediate toothed wheel over the entire range of stroke of focussing.

5 Claims, 1 Drawing Sheet

U.S. Patent

Jun. 14, 1988

4,750,823

CENTRAL FOCUSSING DEVICE FOR INTERNAL FOCUSSING IN BINOCULARS

The present invention relates to a central focussing device for internal focussing in binoculars.

Binoculars must be focussable, whereby lenses are moved in the same direction in both parts of the apparatus via a central focussing wheel to focus on the image. Further, binoculars must be capable o diopter adjustment, which is effected by shifting a lens in only one part of the apparatus.

In the case of internal focussing the moving parts for focussing are located in the interior of the apparatus.

Internal focussing involves a number of advantages over external focussing, i.e. improved sealability when lenses fixed on the outside are used, improved possibilities of design and great robustness, since no movable parts protrude outwardly.

The invention is based on the problem of providing a central focussing device for internal focussing in binoculars, which is distinguished by a simple construction and reliability.

The invention is based on the finding that this problem can be solved by effecting focussing via a displaceable bridge designed in such a way that the drive for the diopter balance can be directed through this bridge or beside and past it.

The subject of the invention is a central focussing device for internal focussing in binoculars which is characterized in that a focussing wheel engages a displaceable bridge via a threaded spindle and the objectives are connected to the displaceable bridge via driving shafts for the purpose of focussing, a diopter adjustment wheel engages one of the driving shafts with screw drive via a driving toothed wheel, an intermediate toothed wheel and a driven toothed wheel in order to vary the position of an objective for diopter adjustment, the intermediate toothed wheel being directed through the bridge or beside and past it and being of a height such that the driven toothed wheel engages the intermediate toothed wheel over the entire range of stroke of focussing.

The focussing wheel is preferably disposed on the objective side and the diopter adjustment wheel on the ocular side.

When the joint of the apparatus is bent to adjust the correct distance between the eyes the diopter adjustment must not be changed. According to the invention, the bridge is therefore directed freely in a guide groove in a bending compensation means located on the driving shaft.

The inventive central focussing device is distinguished by a simple construction and great reliability.

The infinity adjustment (zero position) during assembly can be carried out extremely simply. No mechanical coordinating work is required whatsoever, which makes the efforts for assembly small.

The invention shall be explained in the following with reference to the drawing, which shows an exemplary embodiment.

The figures show:

FIG. 1 a schematic side view in partial cross-section, and

Figure 2:
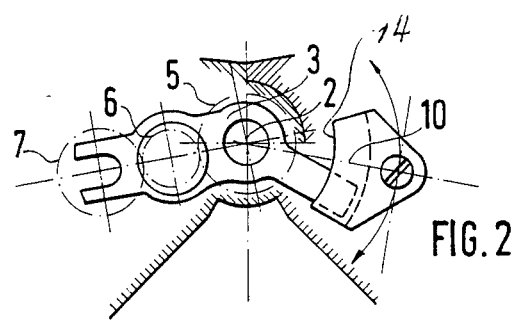

FIG. 2 a top view of the central focussing device according to FIG. 1.

FIG. 1 shows that focussing wheel 1 is disposed on the objective side and engages a displaceable bridge 3 via a threaded spindle 2. When focussing wheel 1 rotates, the bridge moves forward or backward in a focussing direction depending on the direction of rotation.

The bridge communicates with the two driving shafts 8 and 11. These driving shafts are in turn connected to objectives 9, which can thus be moved simultaneously in the same direction by means of focussing wheel 1 to focus on the image.

The diopter adjustment is effected via diopter adjustment wheel 4, which is preferably disposed on the ocular side of the binoculars. Rotation of diopter adjustment wheel 4 causes rotation, via a drivig toothed wheel 5, an intermediate toothed wheel or long pinion gear 6 and a driven toothed wheel or pinion gear 7, of a driving shaft 8 which displaces one of the two objectives 9 via a screw drive 13. The diopter adjustment is thus effected independently of focussing and is added as axial displacement to one of the two objectives.

Bridge 3 is designed in such a way that intermediate toothed wheel 6 can be directed through it or beside and past it. Intermediate toothed wheel 6 is of a height such that driven toothed wheel 7 engages intermediate toothed wheel 6 over the entire range of stroke of focussing.

When the joint of the apparatus is bent (usually about an axis extending parallel to the focussing axis of the objective 9) to adjust the correct distance between the eyes, the diopter adjustment must not be changed. This is effected by providing a so-called "bending compensation means" or slip joint 10 on one of driving shafts 11, said means having a guide groove 14. Bridge 3 is directed freely in this guide groove 14 for accomodating relative rotational motion between bridge 3 and driveshaft 11.

FIG. 2 clearly shows the design of bridge 3 in groove 14 of bending compensation means 10 for permitting relative rotary motion between the bridge 3 and shaft 11, while motion of the bridge 3 in a focussing direction is directly transmitted to shaft 11. This part of bridge 3 is designed in such a way as to guarantee focussing in all bending positions.

FIG. 2 also clearly shows the directing of intermediate toothed wheel 6 through bridge 3.

The inventive central focussing device is particularly well-suited for binoculars having a foamed housing, as described in German Pat. Nos. 25 22 738, 26 18 497 and 32 05 583. Explicit reference is made to the disclosure of these patents.

I claim:

1. A focussing device for binoculars including a pair of objectives mounted so as to be moved simultaneously for focussing and independently for diopter adjustment, comprising:

first and second drive shaft means respectively connected to the objectives, one of the drive shaft means being mounted fo rotation and connected to its respective objective by a threaded coupling so that rotation of said one driveshaft moves its respective objective in focussing directions;

a moveable bridge means connected to the first and second driveshaft means for moving said first and second driveshaft means simultaneously with the bridge means in focussing directions for focussing both objectives simultaneously;

a focussing wheel connected to the bridge so that rotation of the focussing wheel drives the bridge and objectives simultaneously in focussing directions via the first and second driveshaft means;

a diopter adjusting wheel connected to the rotatable driveshaft means so that the latter is rotated when the diopter adjustment wheel is rotated, whereby the respective objective connected thereto may be independently moved in focussing directions relative to the other objective the connection between the diopter adjusting wheel and the rotatable objective driveshaft including a long gear and a pinion engaged thereto, such that axial movement of the driveshaft for simultaneous focussing movement of the objectives is accommodated at the long gear by relative sliding motion between the long gear and pinion, while the driveshaft can be also rotated about its axis through rotation of the long gear; rotation of the diopter adjusting wheel causing rotation of the long gear.

2. A focussing device for binoculars as claimed in claim 1, wherein the bridge is connected to one of the driveshafts by a slip joint arranged so that bridge movement in focussing directions is transmitted to said one driveshaft to move the respective objective connected thereto, while relative rotation is permitted between the bridge and the driveshaft about an axis extending parallel to the focussing axis of the objective.

3. A focussing device for binoculars according to claim 1, wherein the binoculars have opposed ocular and objective end areas, the focussing wheel and diopter adjusting wheel respectively being located separately at the opposed objective and ocular end areas, said long gear located at the diopter end area.

4. A focussing device for binoculars as claimed in claim 1, said long gear extending along the path of movement of the bridge.

5. A focussing device for binoculars as claimed in claim 4, wherein the long gear extends through the bridge.

* * * * *